US011638870B2

(12) United States Patent
Zhang et al.

(10) Patent No.: US 11,638,870 B2
(45) Date of Patent: May 2, 2023

(54) SYSTEMS AND METHODS FOR LOW-LATENCY INITIALIZATION OF STREAMING APPLICATIONS

(71) Applicant: Meta Platforms, Inc., Menlo Park, CA (US)

(72) Inventors: Qunshu Zhang, Sammamish, WA (US); Xiaoxing Zhu, Bellevue, WA (US); Yangpeng Ou, Redmond, WA (US); Qi Ding, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/507,292

(22) Filed: Oct. 21, 2021

(65) Prior Publication Data
US 2022/0126202 A1   Apr. 28, 2022

Related U.S. Application Data

(60) Provisional application No. 63/194,821, filed on May 28, 2021, provisional application No. 63/105,320, filed on Oct. 25, 2020.

(51) Int. Cl.
*A63F 13/355* (2014.01)
*A63F 13/48* (2014.01)
(Continued)

(52) U.S. Cl.
CPC .......... *A63F 13/355* (2014.09); *A63F 13/352* (2014.09); *A63F 13/48* (2014.09);
(Continued)

(58) Field of Classification Search
None
See application file for complete search history.

(56) References Cited

U.S. PATENT DOCUMENTS

| 6,763,518 B2 | 7/2004 | Hart et al. |
| 8,410,994 B1 | 4/2013 | Testa et al. |

(Continued)

FOREIGN PATENT DOCUMENTS

| WO | 2017053539 A1 | 3/2017 |
| WO | 2019147974 A2 | 8/2019 |

OTHER PUBLICATIONS

Abdullah M., at aL, "Predictive Autoscaling of Microservices Hosted in Fog Microdata Center," IEEE Systems Journal, Jun. 10, 2020, vol. 15, No. 1, pp. 1275-1286.

(Continued)

*Primary Examiner* — Jason T Yen
(74) *Attorney, Agent, or Firm* — Greenberg Traurig, LLP

(57) ABSTRACT

The disclosed computer-implemented method may include identifying a video game configured to be available to stream from a server within a cloud gaming environment; pre-loading an instance of the video game on the server before receiving a request by a user to stream the video game to a client system; receiving the request by the user to stream the video game; and allocating the pre-loaded instance of the video game to the user for streaming to the client system in response to receiving the request by the user to stream the video game, thereby reducing a latency between the user submitting the request and the video game being ready for the user to stream. Various other methods, systems, and computer-readable media are also disclosed.

14 Claims, 9 Drawing Sheets

(51) Int. Cl.

| | |
|---|---|
| *A63F 13/79* | (2014.01) |
| *H04L 67/10* | (2022.01) |
| *H04L 67/306* | (2022.01) |
| *A63F 13/352* | (2014.01) |
| *A63F 13/49* | (2014.01) |
| *G06F 9/455* | (2018.01) |
| *H04L 67/141* | (2022.01) |
| *H04L 67/145* | (2022.01) |
| *H04L 65/65* | (2022.01) |
| *H04L 65/612* | (2022.01) |
| *H04L 67/01* | (2022.01) |
| *H04L 67/131* | (2022.01) |
| *H04L 67/568* | (2022.01) |

(52) U.S. Cl.
CPC .............. *A63F 13/49* (2014.09); *A63F 13/79* (2014.09); *G06F 9/45558* (2013.01); *H04L 65/612* (2022.05); *H04L 65/65* (2022.05); *H04L 67/01* (2022.05); *H04L 67/10* (2013.01); *H04L 67/131* (2022.05); *H04L 67/141* (2013.01); *H04L 67/145* (2013.01); *H04L 67/306* (2013.01); *H04L 67/568* (2022.05); *A63F 2300/538* (2013.01); *A63F 2300/5546* (2013.01); *A63F 2300/636* (2013.01); *G06F 2009/45587* (2013.01); *G06F 2009/45595* (2013.01)

(56) References Cited

U.S. PATENT DOCUMENTS

| | | | |
|---|---|---|---|
| 9,704,270 | B1 | 7/2017 | Main et al. |
| 10,491,666 | B2 | 11/2019 | Colenbrander |
| 2007/0174429 | A1 | 7/2007 | Mazzaferri et al. |
| 2012/0005316 | A1 | 1/2012 | Perry et al. |
| 2014/0019963 | A1 | 1/2014 | Deng et al. |
| 2014/0274408 | A1 | 9/2014 | Dave |
| 2014/0342819 | A1* | 11/2014 | Bruno, Jr. ............... A63F 13/30 463/29 |
| 2015/0375113 | A1* | 12/2015 | Justice ................. G06F 9/5027 463/42 |
| 2016/0256784 | A1* | 9/2016 | Schultz ................ A63F 13/358 |
| 2017/0032050 | A1 | 2/2017 | Kol et al. |
| 2017/0185437 | A1 | 6/2017 | Thomas et al. |
| 2018/0189923 | A1 | 7/2018 | Zhong et al. |
| 2018/0270124 | A1 | 9/2018 | Chugtu et al. |
| 2018/0361235 | A1* | 12/2018 | Hunter ................... H04L 67/10 |
| 2019/0308099 | A1 | 10/2019 | Lalonde et al. |
| 2019/0317780 | A1 | 10/2019 | Thomas et al. |
| 2020/0167175 | A1 | 5/2020 | Tsirkin |
| 2020/0171382 | A1 | 6/2020 | Agoston |
| 2020/0204463 | A1 | 6/2020 | Guan et al. |
| 2020/0249819 | A1 | 8/2020 | Berquam et al. |
| 2020/0306632 | A1* | 10/2020 | Kolen .................. A63F 13/358 |
| 2021/0176288 | A1 | 6/2021 | Ahuja et al. |
| 2021/0208918 | A1 | 7/2021 | Singleton, IV et al. |
| 2021/0377623 | A1 | 12/2021 | Larson et al. |

OTHER PUBLICATIONS

Berdajs J., et al., "Extending Applications Using an Advanced Approach to DLL Injection and API Hooking", Software-Practice and Experience, Wiley &Sons, Bognor Regis, GB, Jun. 1, 2010, vol. 40 (7), pp. 567-584, Retrieved on Apr. 20, 2010, XP007917822, ISSN: 0038-0644, DOI: 10.1002/SPE.973.

Chen H., et al., "T-Gaming: A Cost-Efficient Cloud Gaming System at Scale", IEEE Transactions on Parallel and Distributed Systems, IEEE, USA, Dec. 1, 2019, vol. 30 (12), pp. 2849-2865, Retrieved on Nov. 11, 2019, XP011755425, ISSN: 1045-9219, DOI: 10.1109/TPDS.2019.2922205.

Imdoukh M., et al., "Machine Learning—Based Auto—Scaling for Containerized Applications," Neural Computing and Applications, , Oct. 8, 2019, vol. 32, No. 13, pp. 9745-9760.

International Search Report and Written Opinion for International Application No. PCT/US2021/056369, dated Feb. 11, 2022, 7 pages.

International Search Report and Written Opinion for International Application No. PCT/US2021/056370, dated Feb. 10, 2022, 10 pages.

International Search Report and Written Opinion for International Application No. PCT/US2021/056371, dated Feb. 9, 2022, 10 pages.

International Search Report and Written Opinion for International Application No. PCT/US2021/056372, dated Feb. 9, 2022, 8 pages.

International Search Report and Written Opinion for International Application No. PCT/US2021/056373, dated Feb. 8, 2022, 8 pages.

International Search Report and Written Opinion for International Application No. PCT/US2021/056387, dated Feb. 11, 2022, 8 Pages.

Kamarainen T., et al., "Virtual Machines vs. Containers in Cloud Gaming Systems", 2015 International Workshop on Network and Systems Support for Games (Netgames), IEEE, Dec. 3, 2015, Retrieved on Jan. 13, 2016, pp. 1-6, XP032850084, DOI: 10.1109/NETGAMES.2015.7382987.

Mae V., et al., "Dynamic Resource Provisioning in Massively Multiplayer Online Games," IEEE Transactions on Parallel and Distributed Systems, Mar. 1, 2011, vol. 22, No. 3, pp. 380-395.

Zhang X et al., "Improving Cloud Gaming Experience through Mobile Edge Computing," IEEE Wireless Communications, Coordinated Science Laboratory, vol. 26, No. 4, Aug. 1, 2019, 6 pages.

* cited by examiner

SYSTEMS AND METHODS FOR LOW-LATENCY INITIALIZATION OF STREAMING APPLICATIONS

CROSS REFERENCE TO RELATED APPLICATION

This application claims the benefit of U.S. Provisional Application No. 63/105,320, filed 25 Oct. 2020, and U.S. Provisional Application No. 63/194,821, filed 28 May 2021, the disclosures of each of which are incorporated, in their entirety, by this reference. Co-pending U.S. application Ser. No. 17/506,640, filed 20 Oct. 2021, is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
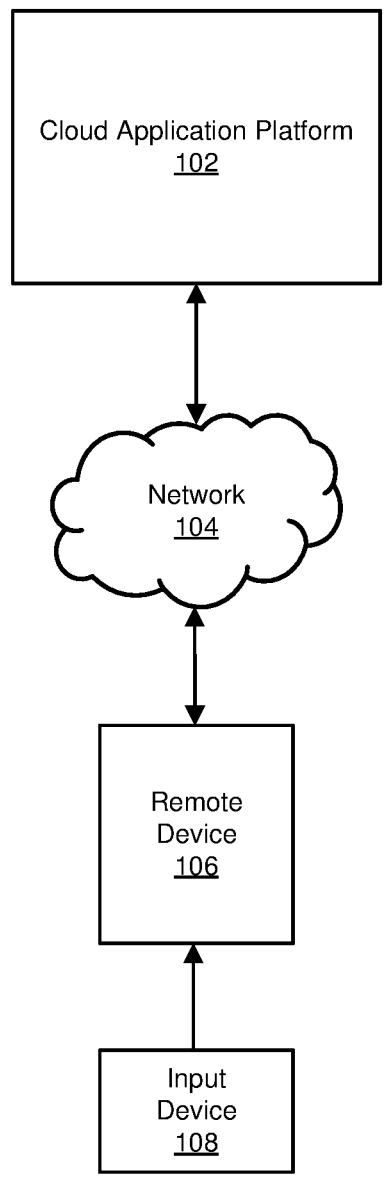
FIG. 1 is an illustration of an exemplary system for streaming applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Users are very sensitive to cloud game loading latency—the longer users need to wait for the game to load, the worse the user experience. Some users may even decide to not play if left waiting too long—resulting in lower user engagement and wasted computations. Cloud game loading latency includes pre-game loading latency and in-game loading latency. The pre-game loading latency is the time required to establish a streaming session and start the game. The in-game loading latency is the time required to finish the game loading including game save file, user specific data, etc.

The present disclosure is generally directed to low-latency initialization of streaming applications (such as video games). As will be explained in greater detail below, embodiments of the present disclosure may preload games in the cloud to lower the loading latency and provide an immediate gaming experience. During a preloading stage, a game instance may be preloaded on a backend gaming server before receiving a user request or allocating the gaming server to the user. The game instance may then be stopped at some point to wait (e.g., for user-specific information, to allow in-game loading to complete). The stop point may be set on a game-specific basis. During a playing stage, upon receiving a user request, a gaming server with the specific game preloaded is allocated to the user. The user may then share their account information with the game so that the game can proceed to play. Because pre-game loading has already completed, users may not need to wait for long. During a recycling stage, the system may save the game state for the user and clean up the gaming instance. To decide which games (with which languages, locales, etc.) to preload to servers, machine learning models may use aggregated historical client behavior to make projections.

By pre-loading instances of games before receive user requests to play the games, systems and methods described herein may improve the functioning of a cloud-hosted gaming infrastructure, of servers that host games, and of client systems that send requests and stream games from servers.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
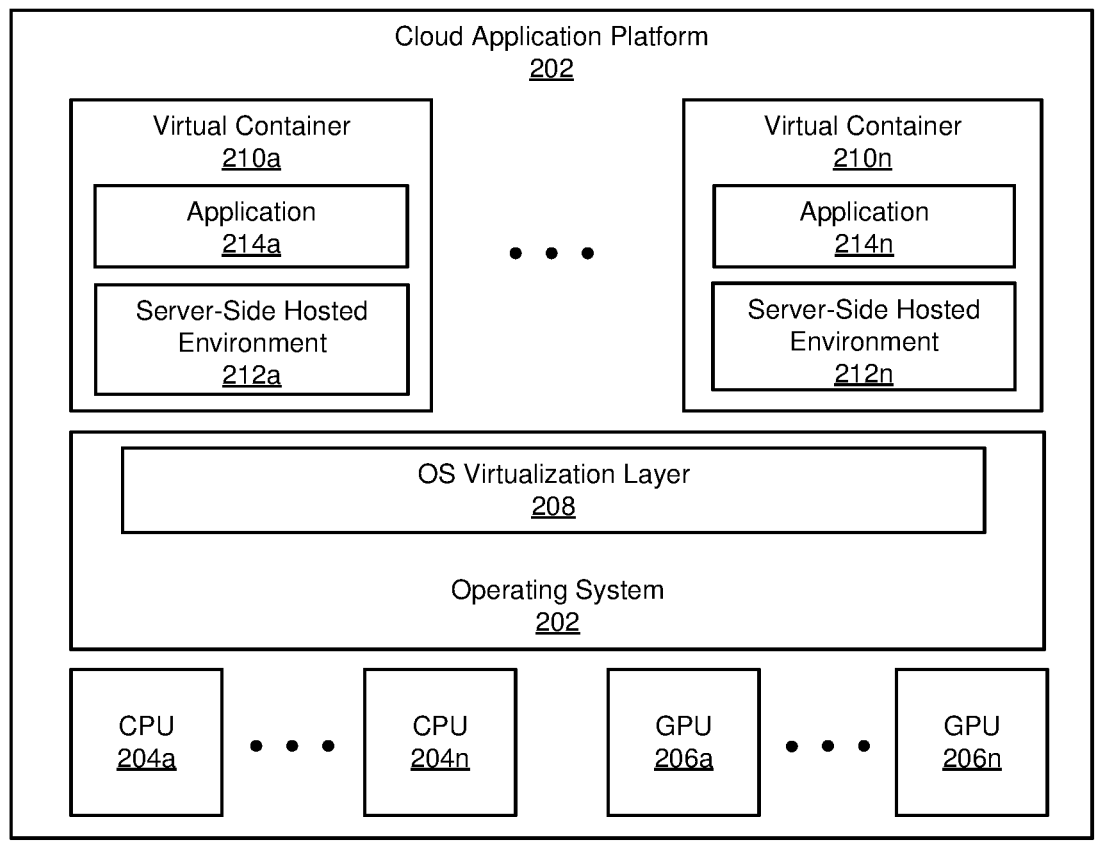
FIG. 2 is a more detailed illustration of various aspects of the system for streaming applications.
Figure 3:
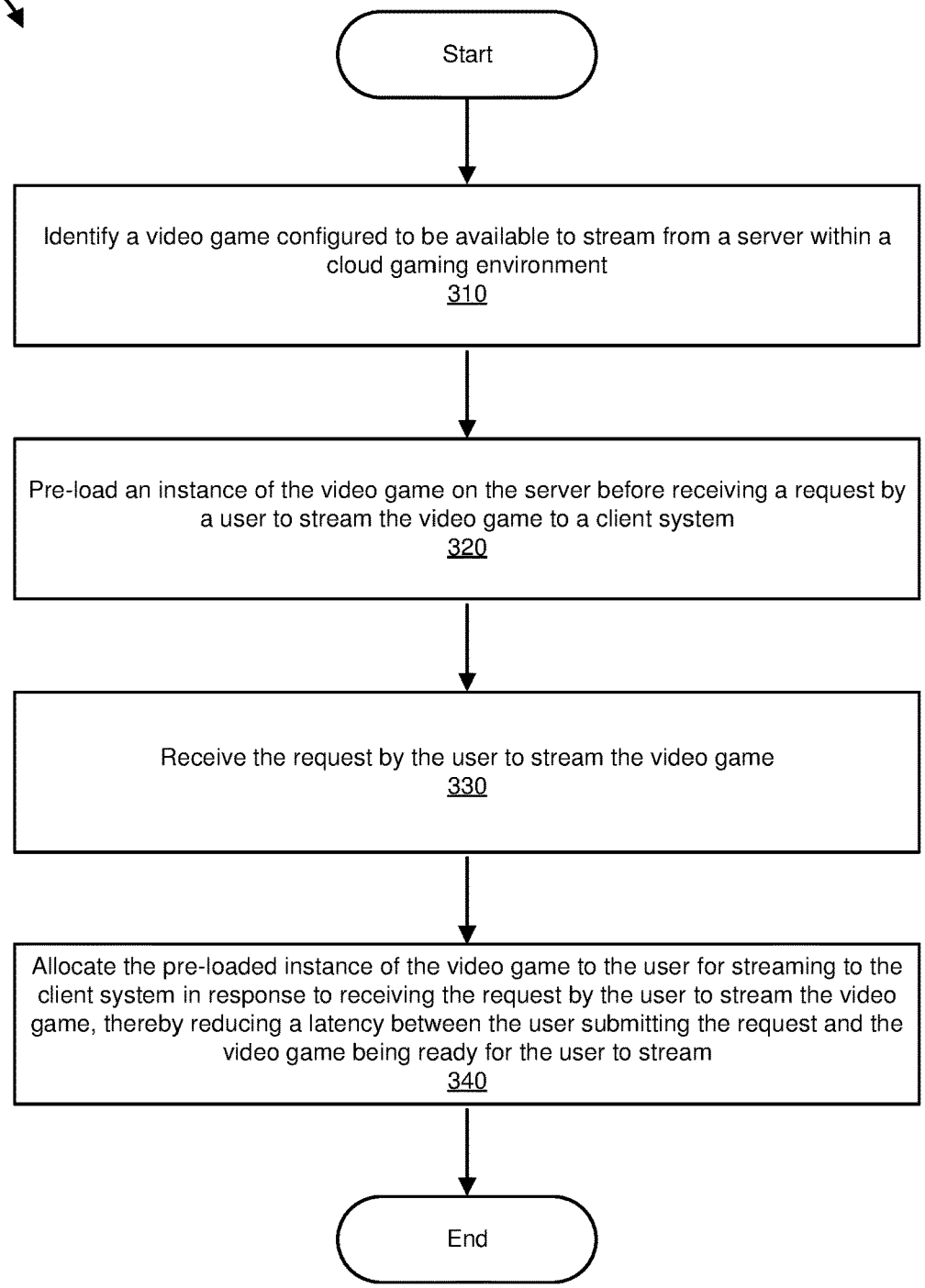
FIG. 3 is a flow diagram of an example method for low-latency initialization of streaming applications.
Figure 4:
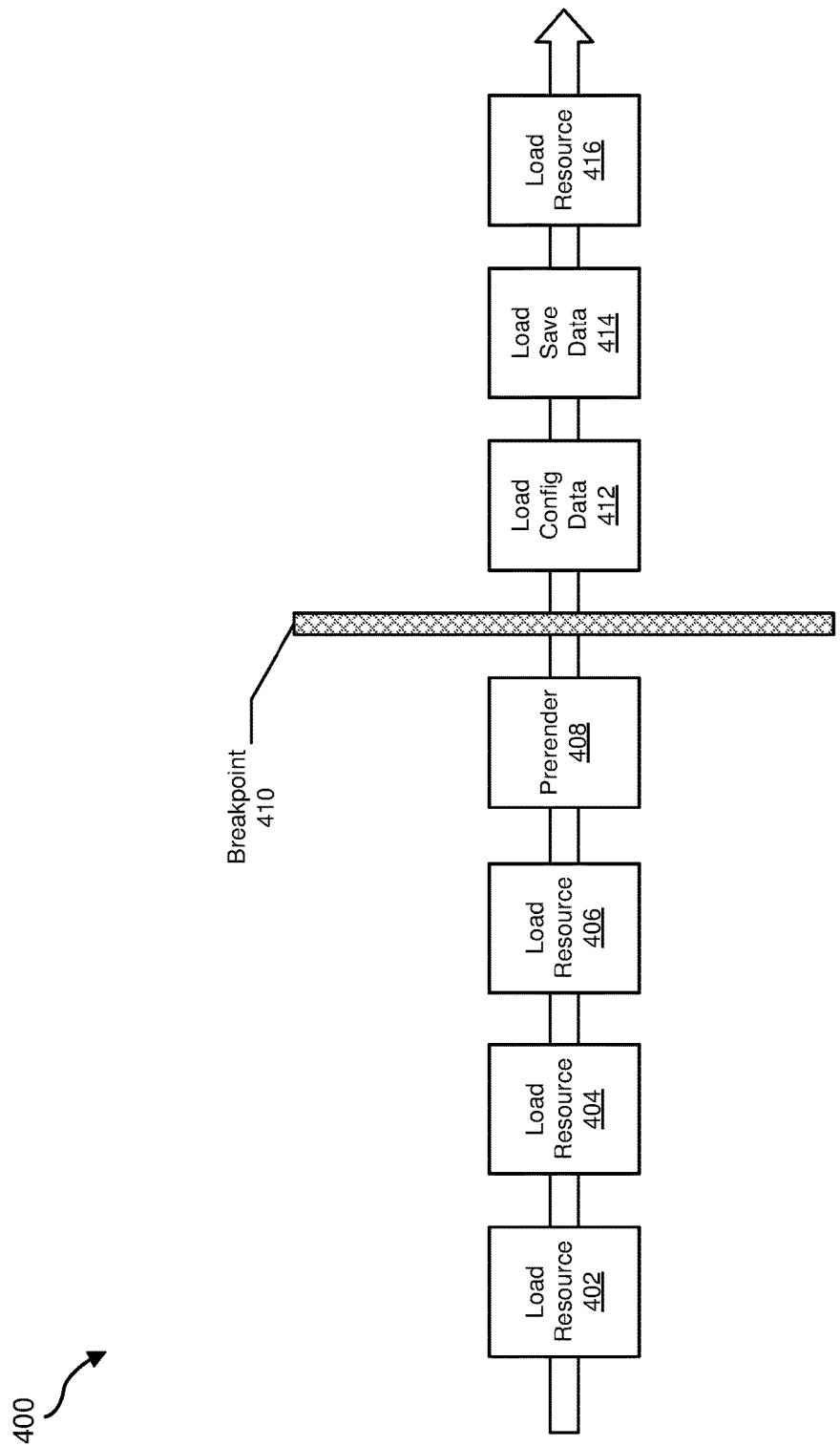
FIG. 4 is a diagram of an example low-latency loading process of a video game.
Figure 5:
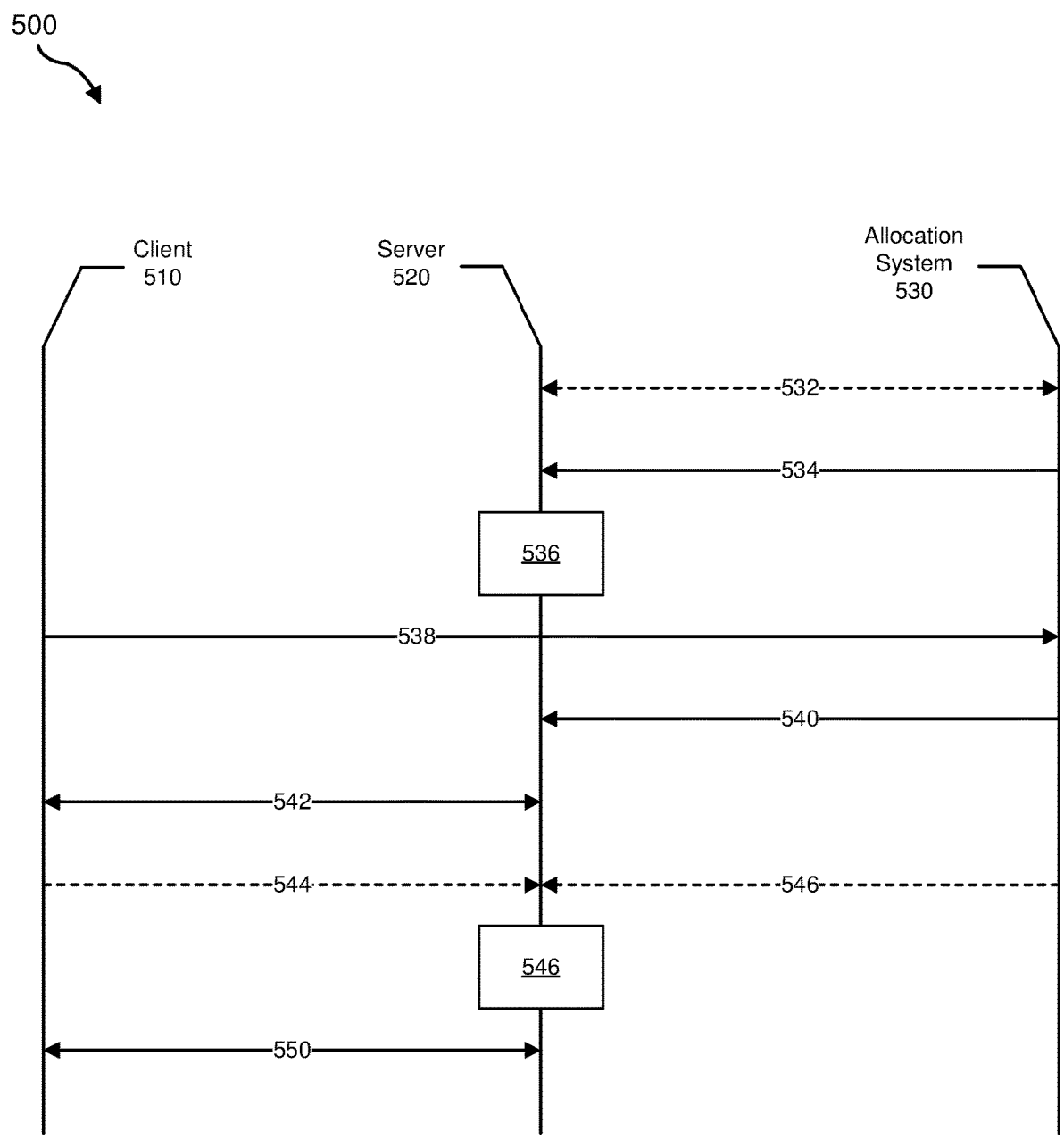
FIG. 5 is a diagram of an example flow for low-latency initialization of streaming applications.
Figure 6:
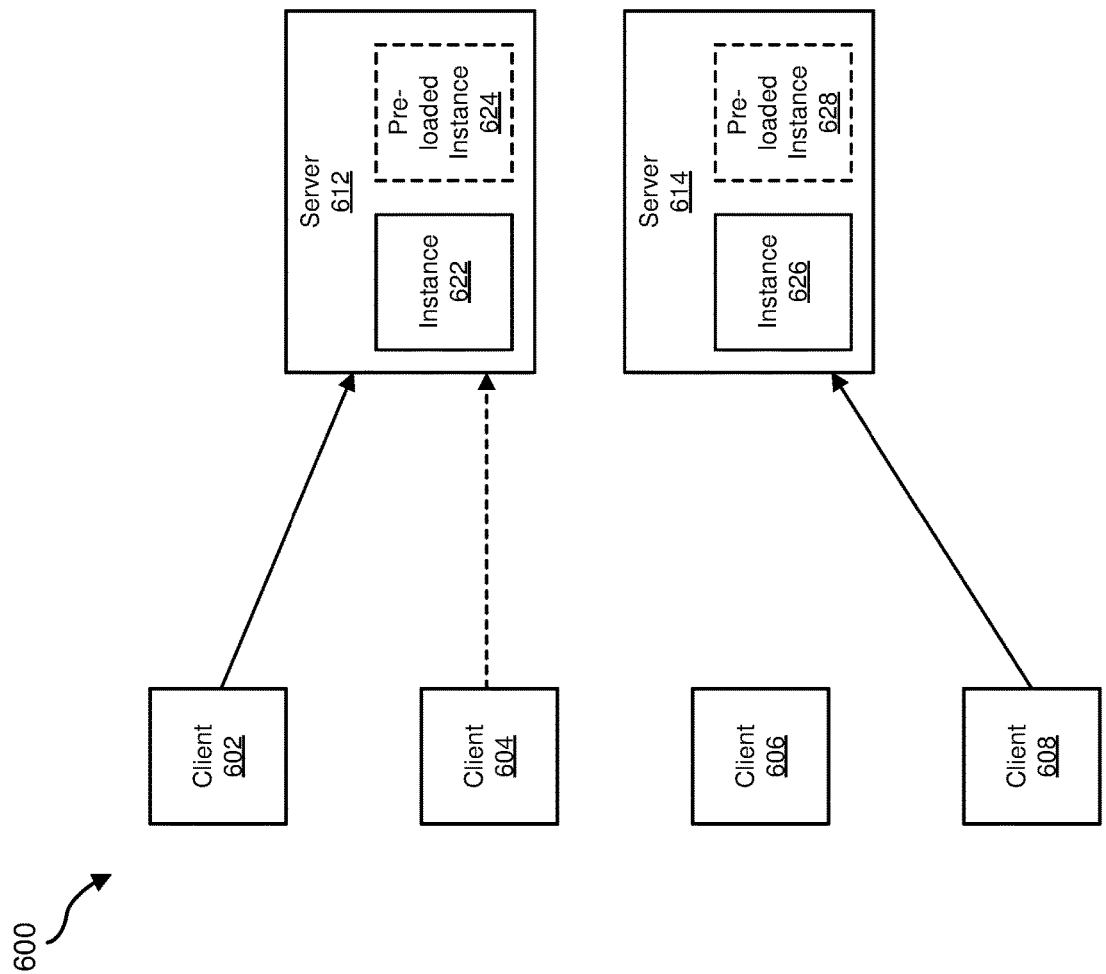
FIG. 6 is an illustration of an example system for allocating pre-loaded instances of a video game.
Figure 7:
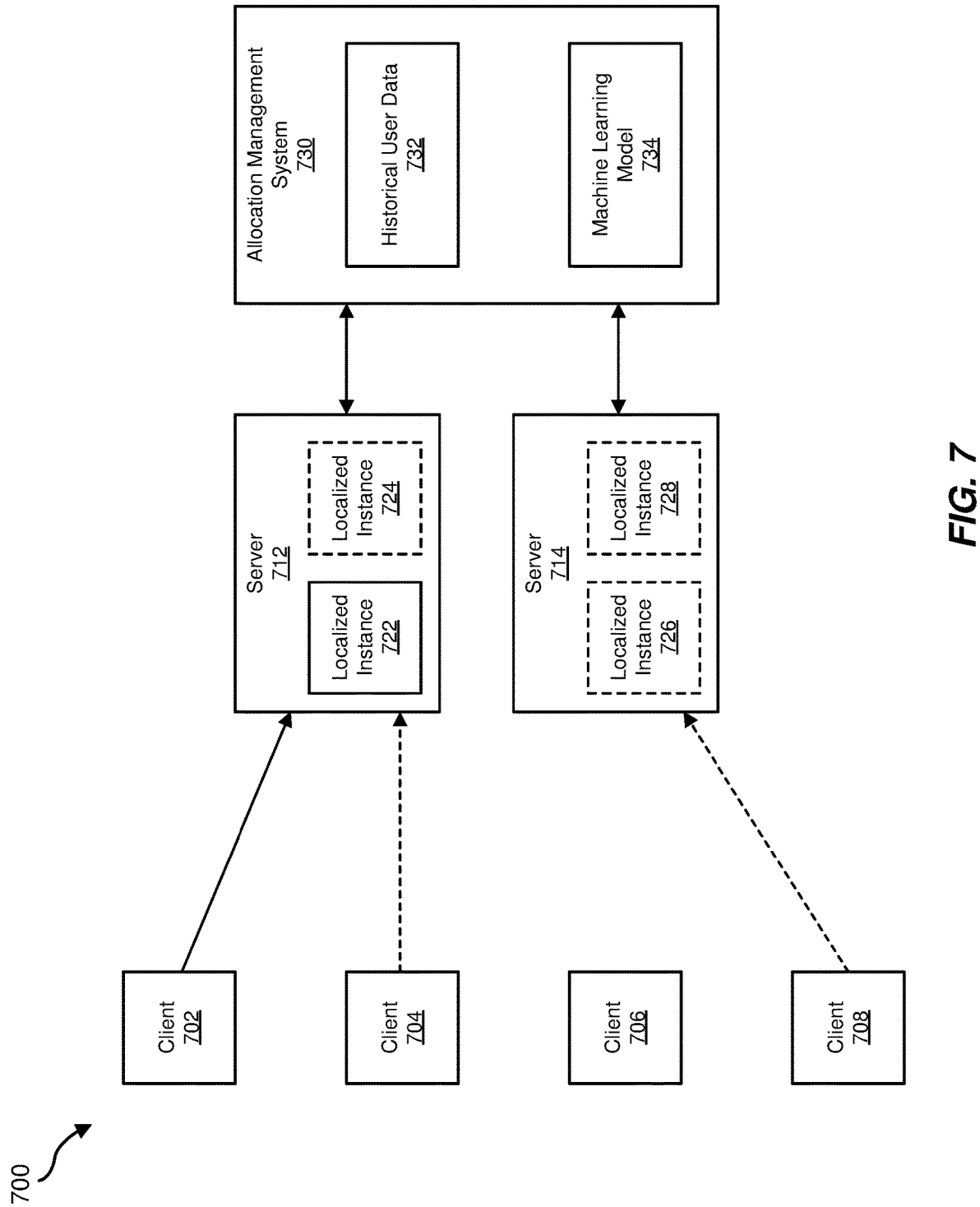
FIG. 7 is an illustration of an example system for allocating pre-loaded localized instances of a video game.

The following will provide, with reference to FIGS. 1-2, example systems for streaming applications; with reference to FIG. 3, an example method for low-latency initialization of streaming applications; with reference to FIGS. 4-5, examples of low-latency loading of video games; and with reference to FIGS. 6-7, examples of the allocation of instances of video games between servers and clients. Furthermore, the following will also provide, with reference to FIGS. 8-9, detailed descriptions of artificial-reality systems including augmented-reality glasses and a virtual-reality headset which, in some examples, may be used as remote devices in accordance with the present subject matter.

FIG. 1 is a diagram of an exemplary system 100 for low-latency loading of streaming applications. As illustrated in FIG. 1, the system 100 may include a cloud application platform 102 communicating with a remote device 106 over a network 104. The cloud application platform 102 may include servers and other software and hardware to host, run, and/or execute an application to provide content, such as, but not limited to, graphics and audio content to the remote device 106. In certain examples, the cloud application platform 102 is at least a portion of and/or is embodied as cloud-hosted infrastructure to provide content for delivery to remote devices 106 over the Internet. Furthermore, although a single cloud application platform 102 is depicted, in certain examples, cloud-hosted infrastructure may include multiple instances of the cloud application platform 102.

Regarding the network 104, any suitable network 104 may be used. In certain examples, the network 104 is the Internet, a LAN, a WAN, or the like. Furthermore, any suitable remote device 106 may be used and may include, without limitation, a mobile device such as a smartphone or tablet, a PC, an artificial-reality system, or the like. The remote device 106 may be a client device to interact with, and/or present content provided by the cloud application platform 102 via a web browser or other application on the remote device 106. Furthermore, the remote device 106 may be in communication with an input device 108 to provide input to the remote device 106. The remote device 106 may, in turn, transmit signals to the cloud application platform 102 to control the application, based in part, on input received from the input device 108. The input device 108 may be any suitable device for providing input and may include, without limitation, a device embodied separately from the remote device 106, such as an external mouse, a keyboard, a game controller, or the like, or a device integrated and/or included with the remote device 106 such as an integrated mouse, a touchscreen, an onboard microphone, or the like.

The cloud application platform 102 may provide an environment with which to execute an application (e.g., a video game) for delivery across the Internet. Specifically, in certain examples, the cloud application platform 102 may provide a server-side hosted environment in which to execute the application. In certain examples, the term "server-side" may refer to a classification of resources that run on a server or other suitable platform to generate and/or deliver content over a network to a remote device 106. In some examples, the cloud application platform 102 may provide various optimizations to allow for enhanced execution of an application such as, for example, applications not designed to operate on the server-side hosted environment, in a cloud-hosted infrastructure, and the like.

In some examples, the cloud application platform 102 may optimize graphics processing of an application executing in the server-side hosted environment, such that an application that is non-native to the server-side hosted environment may execute in such an environment without performance degradation.

In certain examples, and as described in more detail below, the application may be a video game. Furthermore, the video game may be an existing video game designed to execute natively on a local device, on a particular operating system, in a particular environment, or the like. Therefore, the system 100 may host and provide cloud delivery for an existing game, designed for a different platform, to allow for an end-user to play on the end-user's device without performance degradation and without the need for substantial modifications to the game.

The cloud application platform 102 may have any suitable architecture to allow execution of an application in a server-side hosted environment. FIG. 2 depicts one example of the system 200 with the cloud application platform 102 of FIG. 1 having exemplary architectural details. The cloud application platform 102 may include an operating system 202 in communication with and running on one or more central processing units ("CPUs") 204a-204n. The operating system 202 may also be in communication with one or more graphics processing units ("GPUs") 206a-206n for image and graphics processing. The cloud application platform 102 may have any suitable number of CPUs 204 and GPUs 206.

The operating system 202 may be any suitable operating system. In one example, the operating system 202 supports the basic functioning of the cloud application platform 102 such as hardware and software management, access to resources, task management, and the like. The operating system may include an operating system ("OS") virtualization layer 208 to provide operating system virtualization capabilities allowing the cloud application platform 102 to support multiple, isolated virtual environments. Any suitable OS virtualization layer 208 may be used. In some examples, the OS virtualization layer 208 is a Kernel-based Virtual Machine ("KVM").

The operating system 202 and OS virtualization layer 208 may support one or more virtual containers 210. The cloud application platform 102 may use any suitable virtual container 210. A virtual container 210, in certain examples, is a virtualized software unit providing an isolated environment for software execution and is described in greater detail below.

A virtual container 210 may provide a sandboxed environment to support and execute a server-side hosted environment 212. Likewise, the server-side hosted environment 212 may, in turn, execute an application 214. As will be described in greater detail below, the server-side hosted environment 212 may be any suitable environment for executing the application 214. In certain examples, the server-side hosted environment 212 may be an operating system, an emulator that emulates a specific operating system, an operating system virtual machine, and the like.

Although FIG. 2 depicts a single application 214 executing on a single server-side hosted environment 212, in other examples, multiple applications 214 may execute on a single server-side hosted environment 212. The server-side hosted environment 212, virtual container 210, virtualization layer 208, and/or the operating system 202 may be configured to provide security and isolation among different applications 214 such that one application 214a is isolated from another 214n. Furthermore, as described in greater detail below, in certain examples, the cloud application platform 102 may dynamically create, allocate, and/or provision instances of a virtual container 210 and/or server-side hosted environment 212 as needed. Specifically, when a user initializes an application 214, the cloud application platform 102 may allocate an instance of a virtual container 210 and/or server-side hosted environment 212 to run the application 214 and then deallocate and/or terminate the instance once the user finishes interacting with the application 214. In some examples, as will be explained in greater detail below, the cloud application platform 102 may allocate an instance of the virtual container 210 and/or server-side hosted environment 212 to run the application 214 before the user (or another user) initializes the application 214.

FIG. 3 illustrates an example method for low-latency initialization of a streaming application. The steps shown in FIG. 3 may be performed by any suitable computer-executable code and/or computing system, including the system(s) illustrated in FIGS. 1-2. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a video game configured to be able to stream from a server within a cloud gaming environment (such as that provided by cloud application platform 102 of FIG. 1). As used herein, the term "stream" may generally refer to any process whereby an application, such as a video game, executes on a server while input is received from a remote client and output (e.g., graphics, sound, etc.) is presented to the remote client in real-time.

The systems described herein may identify the video game in any suitable context. For example, the systems described herein may identify the video game as one of multiple video games digitally catalogued by and/or for execution within the cloud gaming environment. In some examples, the systems described herein may identify the video game by receiving a communication from an allocation management system that directs the server (and, e.g., one or more additional servers) to load and/or pre-load instances of applications, such as the video game. For example, the systems described herein may receive a communication indicating a number of instances of the video game (e.g., one or more) to be pre-loaded on the server. Thus, for example, the systems described herein may determine that an insufficient number of instances of the video game are pre-loaded on the server.

Returning to FIG. 3, at step 320 one or more of the systems described herein may pre-load an instance of the video game on the server before receiving a request by a user to stream the video game to a client system.

As used herein, the term "pre-loading" may refer to any operation or set of operations that contribute to initializing an instance of an application within a computing environment. Examples of such operations may include, without limitation, initializing and/or configuring a virtual container within which to execute the application, provisioning the virtual container with resources (e.g., processing resources, memory resources, storage resources, and/or networking resources), and/or starting execution of the application (e.g., such that the application one or more initialization and/or loading operations, such as loading data from non-volatile memory into volatile memory). In some examples, pre-loading may also include retrieving and/or caching data upon which the application depends (e.g., if the data is virtually stored remotely, instructing the virtual storage system to locally cache the data).

As discussed earlier, loading a video game may include pre-game loading operations (e.g., establishing a streaming session and starting the game such that the game performs some loading operations) and other, user-specific loading operations (e.g., a game save file, user-specific data, etc.). In some examples, "pre-loading" may refer to loading operations that are not user-specific (such as, e.g., establishing a streaming session and/or starting execution of the game, where the game performs loading operations before and/or other than user-specific operations). In one example, pre-loading operations may include executing the game to load various game assets and resources (textures, meshes, shaders) and/or to perform pre-computations (e.g., pre-rendering and other calculations that can be performed before game play).

As pre-loading the instance of the video game may include performing some, but not all, loading operations, in some examples the systems described herein may determine which loading operations to perform in advance of allocating the instance of the video game to a user (and, e.g., in advance of receiving a request from the user to stream the video game). Thus, for example, these systems may determine a subset of loading operations to perform for the video before receiving the request and a remainder of loading operations to perform for the video game after receiving the request.

In some examples, the subset of loading operations may not depend on user-specific information while at least a portion of the remainder of loading operations may depend on user-specific information. Examples of user-specific information may include, without limitation, user identifying information, user account information, user account credentials, user save files and/or user game progress information, and user-specific game configuration information. In some examples, loading operations that depend on user-specific information may include loading of assets that are relevant to the particular user (e.g., given a user's saved progress in the game).

The systems described herein may determine, designate, and/or execute the subset of loading operations (to take place during preloading) while, e.g., delaying the loading of the remainder of the loading operations in any of a variety of ways. For example, the systems described herein may pause a loading procedure after performing the subset of loading operations. In some examples, the loading procedure performed by the video game in execution. Accordingly, in some examples, the systems described herein may pause the loading procedure by pausing execution of the video game. For example, the systems described herein may insert and/or identify a breakpoint in the executable instructions of the video game after the subset of loading operations and before the remainder of the loading operations. Additionally or alternatively, the systems described herein may insert a hook into the video game and/or a library used by the video game that pauses execution of the video game—e.g., a hook into a function that relates to user-specific information.

In some examples, the video game may be programmed or modified to designate a pausing point. For example, a software development kit (SDK) may allow a developer to specify a pre-loading pausing point. Additionally or alternatively, the video game may be programmed or modified to identify and perform loading operations that are not user-specific first, and to reserve user-specific loading operations for last, thus allowing more loading operations to occur during the pre-loading of the instance of the video game.

The systems described herein may pre-load the instance of the video game on the server in any suitable context. In some examples, the systems described herein may pre-load the instance of the video game on the server in response to an instruction from an allocation management system that determines how many instances of which video games are to be pre-loaded on which servers of a cloud gaming service. In some examples, the systems described herein may determine a number of instances of the video game to pre-load on the server. In these examples, the systems described herein may pre-load the instance of the video game on the server in response to the determined number of instances (e.g., in response to determining that the number of pre-loaded instances of the video game on the server are fewer than the specified number to be pre-loaded). In some examples, the systems described herein may pre-load the instance of the video game in response to determining that another instance of the video game that was previously pre-loaded has been allocated to a user and is no longer available for a new request.

Systems described herein may determine whether the server is to pre-load the instance of the video game and/or may determine the number of instances of the video game to pre-load on the server based at least in part on historical user data indicating a demand for the video game. For example, systems described herein may gather, aggregate, and/or otherwise identify data regarding how many user requests to stream the video game have been made (e.g., over a selected time period). These systems may then determine how many instances of the video game to pre-load on the server to meet predicted demand based on past usage data and/or to balance predicted demand against computing resource constraints (e.g., against other video games that may also potentially be pre-loaded on the server). In some examples, the historical user data may also include information about the time of day of user requests, the geographical region of user requests, and/or the localizations requested by users. In these examples, the systems described herein may accordingly determine whether the server is to pre-load the instance of the video game based on the current time and/or the geographical region of the server. Additionally or alternatively, the systems described herein may determine which localization of the video game to pre-load based on the historical user data.

In some examples, a machine learning model may determine whether to pre-load the instance of the video game on the server and/or how many instances of the video game to pre-load on the server. For example, systems described herein may train the machine learning model based at least in part on the historical user data within the cloud gaming environment.

Returning to FIG. 3, at step 330 one or more of the systems described herein may receive the request by the user to stream the video game (e.g., to the client system).

Systems described herein may receive the request in any of a variety of contexts. For example, the user may select the video game to play on the client system. In some examples, the client system may communicate the selection to a cloud gaming service. For example, the client system may communicate the selection to a server of the cloud gaming service (e.g., the server discussed with respect to steps 310 and 320 above and/or another server deployed for use of the cloud gaming service). In some examples, the client system may communicate the selection to an allocation management system that matches user requests to a server.

In some examples, the process of selecting the video game on the client system may be seamless from the user's perspective; that is, the interface presented to the user on the client system may show one or more video games available to be launched by the user, and the user may select the video game to launch. From the user's perspective, the video game may quickly begin streaming to the user with minimal latency and/or load times.

Returning to FIG. 3, at step 340 one or more of the systems described herein may allocate the pre-loaded instance of the video game to the user for streaming to the client system in response to receiving the request by the user to stream the video game, thereby reducing a latency between the user submitting the request and the video game being ready for the user to stream.

Upon and/or after allocating the pre-loaded instance of the video game to the user, in some examples user-specific information relating to the user may be provided to the pre-loaded instance of the video game (e.g., to allow the execution of user-specific loading operations). In addition, in those examples in which it was paused, the instance of the video game may resume execution.

FIG. 4 illustrates an example loading process 400. As shown in FIG. 4, loading process 400 may involve loading operations performed by an executing instance of a video game. For example, systems described herein may pre-load the instance of the video game by preparing a virtual container for the instance of the video game and beginning execution of the instance of the video game within the virtual container. Upon execution the instance of the video game may perform an operation 402 to load a resource (e.g., data used to generate graphics, audio, and/or game logic). Similarly, the instance of the video game may perform operations 404 and 406 to load resources. In addition, the instance of the video game may perform an operation 408 to prerender a graphical element of the video game. At a breakpoint 410, systems described herein may pause the execution of the instance of the video game, completing the pre-loading process. Once the instance of the video game has been allocated to a specific user, systems described herein may unpause the execution of the instance of the video game. Accordingly, the instance of the video game may then perform an operation 412 to load configuration data corresponding to the specific user. In addition, the instance of the video game may perform an operation 414 to load save data for the specific user. Furthermore, the instance of the video game may perform an operation 416 to load a resource (e.g., that was selected for loading in advance of gameplay based on the user's save data).

From the user's perspective, upon selecting the video game to play, the video game appears to load quickly as the user only waits for the loading operations subsequent to breakpoint 410 before gameplay rather than waiting for the loading operations performed prior to breakpoint 410.

FIG. 5 illustrates an example flow between systems for low-latency initialization of a streaming video game. As shown in FIG. 5, the flow may occur between a client 510, a server 520, and an allocation system 530. At step 532, server 520 and allocation system 530 may negotiate how many instances of a video game are to be pre-loaded on server 520. For example, server 520 may communicate information to allocation system 530 including how many instances of the video game are already pre-loaded on server 520, how many instances of the video game have been allocated to users, and/or how many free resources are available on server 520. At step 534, allocation system 530 may instruct server 520 to pre-load a new instance of the video game. At step 536, server 520 may preload the instance of the video game.

At step 538, client 510 may send a request to allocation system 530 to stream the video game. At step 540, allocation system 530 may allocate the request to server 520. At step 542, server 520 and client 510 may negotiate a connection. At step 544, client 510 may provide user-specific information to server 520. Additionally or alternatively, at step 546 allocation system 530 may provide user-specific information to server 520. At step 546, server 546 may continue execution of the video game, including any remaining loading operations, such as those requiring the user-specific information. At step 550, now streaming to client 510.

FIG. 6 illustrates an example system for low-latency initialization of streaming applications. As shown in FIG. 6, clients 602, 604, 606, and 608 may be configured to utilize a cloud game streaming service. Servers 612 and 614 may be configured to provide the cloud game streaming service. In one example, server 612 may be streaming an instance 622 of a video game to client 602. Likewise, server 614 may be streaming an instance 626 of a video game to client 608. In addition, server 612 may have a pre-loaded instance 624 of the video game and server 614 may have a pre-loaded instance 628 of the video game. Thus, when client 604 attempts to stream the video game, pre-loaded instance 624 is already available for use by client 604.

FIG. 7 illustrates another example system for low-latency initialization of streaming applications. As shown in FIG. 7, clients 702, 704, 706, and 708 may be configured to utilize a cloud game streaming service. Servers 712 and 714 may be configured to provide the cloud game streaming service. An allocation management system 730 may have historical user data 732 regarding historical use of a video game on the cloud game streaming service. A machine learning model 734 may be trained on historical user data 732 to predict a need for pre-loaded instances of the video game. Historical user data 732 may include information indicating the localization preferences of various users and, thus, machine learning model 734 may predict the need for pre-loading specific localizations of the video game. Thus, for example, clients 702 and 704 may have a specified preference for a U.S. English localization while clients 706 and 708 may have a specified preference for a Brazilian Portuguese localization. Thus, server 712 may stream a localized instance 722 with a U.S. English localization to client 702. In addition, server 712 may pre-load a localized instance 724 with a U.S. English localization, while server 714 may pre-load localized instances 726 and 728 with Brazilian Portuguese localizations. Thus, when client 704 attempts to stream the video game, server 712 may have localized instance 724 pre-loaded and ready for the preferred localization of client 704. Likewise, when client 708 attempts to stream the video game, server 714 may have localized instance 726 pre-loaded and ready for the preferred localization of client 708. Should client 706 (or another client with a Brazilian Portuguese localization preference) later attempt to stream the video game, server 714 will also have localized instance 728 ready for client 706.

For streaming application platforms such as cloud gaming, users may be very sensitive to loading latency. Therefore, systems may pre-load games in the cloud to lower the loading latency significantly and provide immediate gaming experience. A workflow may include three stages: preloading, play, and recycling. During the preloading stage, every time the system prepares a backend gaming server, the system may start a game in this gaming server based on some coordination logic in an orchestration service. The game will stop at some point to wait for more input from the platform to proceed. This stop point may vary by game and the stop may coordinated with cloud gaming platform via a gaming SDK. The orchestration service may control how many game instances should be preloaded for this particular game, and in which region. During the play stage, upon receiving an user request, the system may allocate a gaming server with the specific game preloaded in the system, and then users may share their account information into the game based on their consent so the game can proceed to gameplay. In this stage, users may not need to wait for a significant amount of time. During the recycling stage, the system may save the game state for users, clean up the gaming instance, and return to the preload stage to prepare the game for another user. In order to decide which game, language, locale, etc. to load, the system may use machine learning technology based on aggregated historical client patterns to make projections.

EXAMPLE EMBODIMENTS

Example 1: A computer-implemented method for low-latency initialization of streaming applications may include identifying a video game configured to be available to stream from a server within a cloud gaming environment; pre-loading an instance of the video game on the server before receiving a request by a user to stream the video game to a client system; receiving the request by the user to stream the video game; and allocating the pre-loaded instance of the video game to the user for streaming to the client system in response to receiving the request by the user to stream the video game, thereby reducing a latency between the user submitting the request and the video game being ready for the user to stream.

Example 2: The computer-implemented method of Example 1, where pre-loading the instance of the video game on the server before receiving the request includes: determining a subset of loading operations to perform for the video before receiving the request and a remainder of loading operations to perform for the video game after receiving the request; and performing the subset of the loading operations for the instance of the video game before receiving the request.

Example 3: The computer-implemented method of any of Examples 1 and 2, where the subset of loading operations does not depend on user-specific information; and at least a portion of the remainder of loading operations depends on user-specific information.

Example 4: The computer-implemented method of any of Examples 1-3, further including pausing a loading procedure after performing the subset of loading operations; receiving the user-specific information in connection with allocating the pre-loaded instance of the video game to the user; and resuming the loading procedure in response to receiving the user-specific information and using the user-specific information while performing the remainder of loading operations.

Example 5: The computer-implemented method of any of Examples 1-4, further including determining a number of instances of the video game to pre-load on the server; where pre-loading the instance of the video game on the server before receiving the request is performed responsive to the number of instances determined.

Example 6: The computer-implemented method of any of Examples 1-5, where determining the number of instances of the video game to pre-load on the server is based at least in part on historical user data indicating a demand for the video game.

Example 7: The computer-implemented method of any of Examples 1-6, where: determining the number of instances of the video game to pre-load on the server includes determining a number of instances of a localization of the video game to pre-load on the server; and pre-loading the instance of the video game on the server before receiving the request includes pre-loading an instance of the localization of the video game responsive to the number of instances of the localization determined.

Example 8: The computer-implemented method of any of Examples 1-7, where determining the number of instances of the video game to pre-load on the server is based at least in part on an output of a machine learning model trained at least in part on historical user data within the cloud gaming environment.

Example 9: The computer-implemented method of any of Examples 1-8, where: a plurality of users are registered to the cloud gaming environment; and the instance of the video game pre-loaded on the server is available to any of the plurality of users before being allocated to the user.

Example 10: The computer-implemented method of any of Examples 1-9, further including: identifying an additional video game configured to be available to stream from the server within the cloud gaming environment; pre-loading an instance of the additional video game on the server before receiving an additional request by an additional user to stream the video game to an additional client system; receiving the additional request by the additional user to stream the additional video game; and allocating the pre-loaded instance of the additional video game to the additional user for streaming to the additional client system in response to receiving the additional request by the additional user to stream the additional video game, thereby reducing a latency between the additional user submitting the additional request and the additional video game being ready for the additional user to stream.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
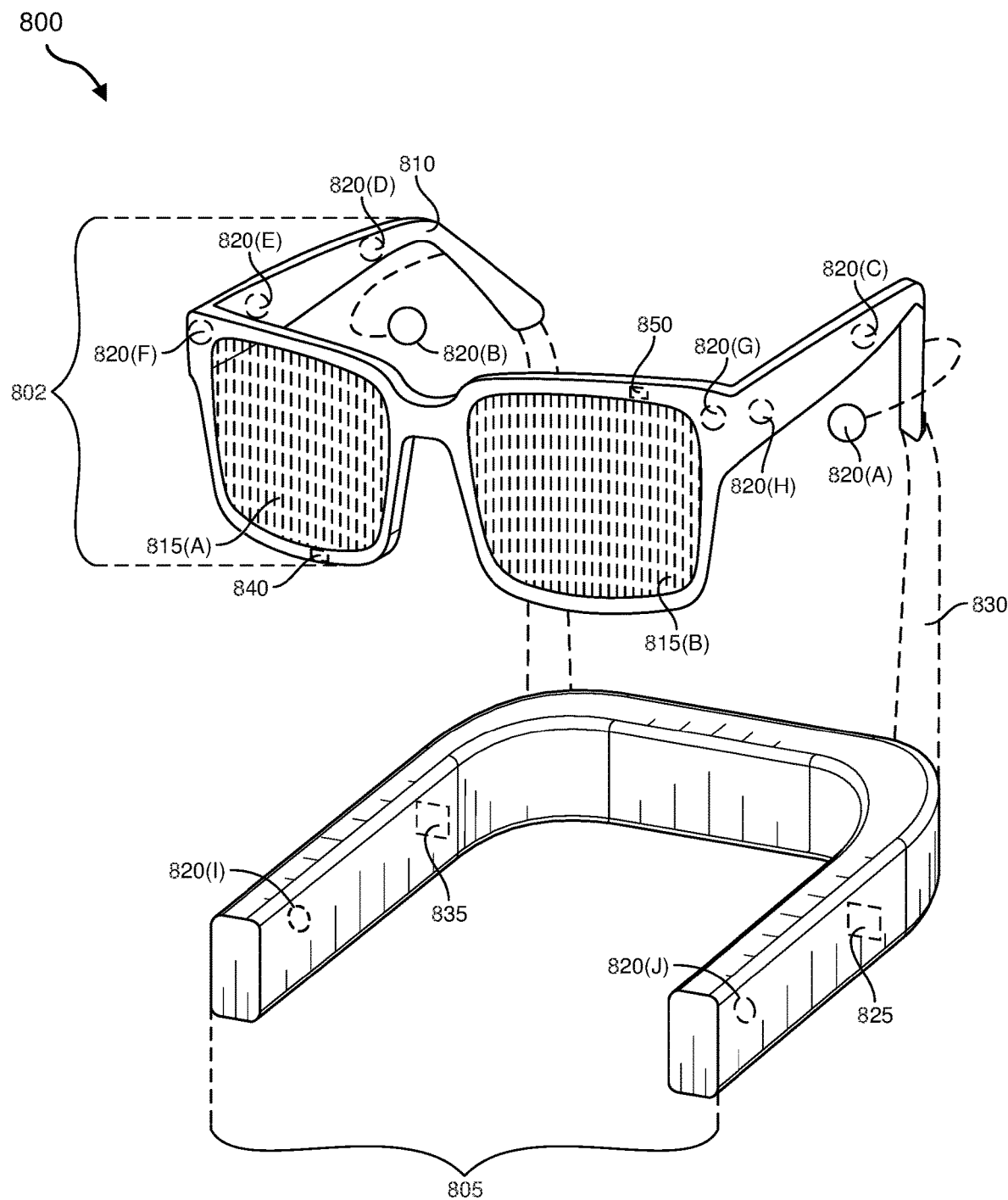
FIG. 8 is an illustration of exemplary augmented-reality glasses that may be used in connection with embodiments of this disclosure.
Figure 9:
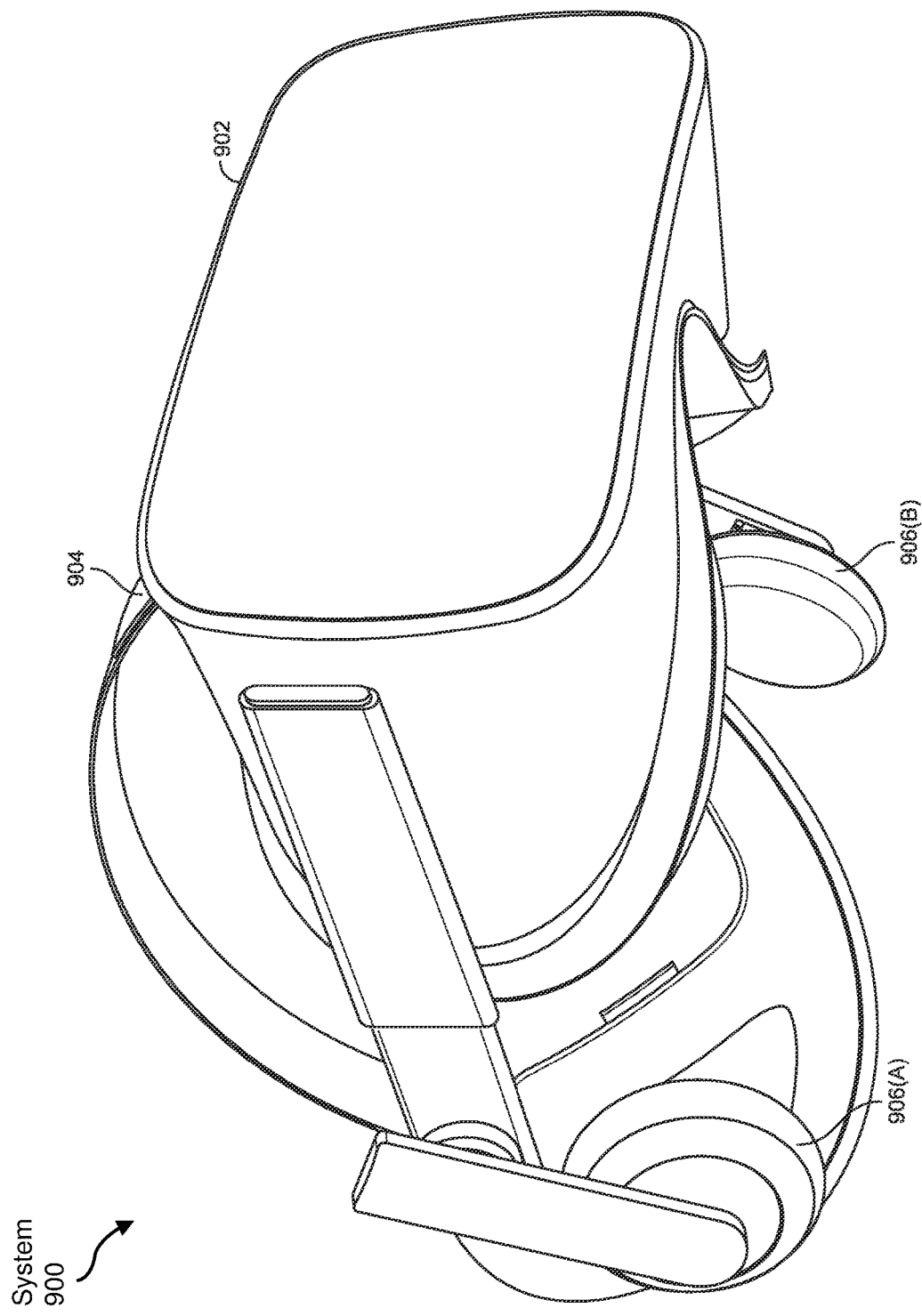
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820(D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a pre-loading instruction to be transformed, transform the pre-loading instruction, output a result of the transformation to pre-load a video game, use the result of the transformation to provide low-latency initialization of the video game, and store the result of the transformation to provide low-latency initialization of the video game. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying a video game configured to be available to stream from a server within a cloud gaming environment;
   pre-loading an instance of the video game on the server before receiving a request by a user to stream the video game to a client system by:
      determining a subset of loading operations that do not depend on user-specific information to perform for the video game before receiving the request and a remainder of loading operations, at least a portion of which depend on user-specific information, to perform for the video game after receiving the request; and
      pausing a loading procedure after performing the subset of loading operations;
   receiving the request by the user to stream the video game;
   allocating the pre-loaded instance of the video game to the user for streaming to the client system in response to receiving the request by the user to stream the video game;
   receiving the user-specific information in connection with allocating the pre-loaded instance of the video game to the user; and
   resuming the loading procedure in response to receiving the user-specific information and using the user-specific information while performing the remainder of loading operations.

2. The computer-implemented method of claim 1,
   further comprising determining a number of instances of the video game to pre-load on the server;
   wherein pre-loading the instance of the video game on the server before receiving the request is performed responsive to the number of instances determined.

3. The computer-implemented method of claim 2, wherein determining the number of instances of the video game to pre-load on the server is based at least in part on historical user data indicating a demand for the video game.

4. The computer-implemented method of claim 2, wherein:
   determining the number of instances of the video game to pre-load on the server comprises determining a number of instances of a localization of the video game to pre-load on the server; and
   pre-loading the instance of the video game on the server before receiving the request comprises pre-loading an instance of the localization of the video game responsive to the number of instances of the localization determined.

5. The computer-implemented method of claim 2, wherein determining the number of instances of the video game to pre-load on the server is based at least in part on an output of a machine learning model trained at least in part on historical user data within the cloud gaming environment.

6. The computer-implemented method of claim 1, wherein: a plurality of users are registered to the cloud gaming environment; and the instance of the video game pre-loaded on the server is available to any of the plurality of users before being allocated to the user.

7. The computer-implemented method of claim 1, further comprising:
   identifying an additional video game configured to be available to stream from the server within the cloud gaming environment;

pre-loading an instance of the additional video game on the server before receiving an additional request by an additional user to stream the video game to an additional client system;

receiving the additional request by the additional user to stream the additional video game; and allocating the pre-loaded instance of the additional video game to the additional user for streaming to the additional client system in response to receiving the additional request by the additional user to stream the additional video game, thereby reducing a latency between the additional user submitting the additional request and the additional video game being ready for the additional user to stream.

8. A system comprising:

at least one physical processor;

physical memory comprising computer-executable instructions that, when executed by the physical processor, cause the physical processor to:
- identify a video game configured to be available to stream from a server within a cloud gaming environment;
- pre-load an instance of the video game on the server before receiving a request by a user to stream the video game to a client system by:
  - determining a subset of loading operations that do not depend on user-specific information to perform for the video game before receiving the request and a remainder of loading operations, at least a portion of which depend on user-specific information, to perform for the video game after receiving the request; and
  - pausing a loading procedure after performing the subset of loading operations;
- receive the request by the user to stream the video game;
- allocate the pre-loaded instance of the video game to the user for streaming to the client system in response to receiving the request by the user to stream the video game;
- receive the user-specific information in connection with allocating the pre-loaded instance of the video game to the user; and
- resume the loading procedure in response to receiving the user-specific information and using the user-specific information while performing the remainder of loading operations.

9. The system of claim 8, wherein the instructions further cause the physical processor to determine a number of instances of the video game to pre-load on the server;

wherein pre-loading the instance of the video game on the server before receiving the request is performed responsive to the number of instances determined.

10. The system of claim 9, wherein determining the number of instances of the video game to pre-load on the server is based at least in part on historical user data indicating a demand for the video game.

11. The system of claim 9, wherein:

determining the number of instances of the video game to pre-load on the server comprises determining a number of instances of a localization of the video game to pre-load on the server; and pre-loading the instance of the video game on the server before receiving the request comprises pre-loading an instance of the localization of the video game responsive to the number of instances of the localization determined.

12. The system of claim 9, wherein determining the number of instances of the video game to pre-load on the server is based at least in part on an output of a machine learning model trained at least in part on historical user data within the cloud gaming environment.

13. The system of claim 8, wherein:

a plurality of users are registered to the cloud gaming environment; and the instance of the video game pre-loaded on the server is available to any of the plurality of users before being allocated to the user.

14. A non-transitory computer-readable medium comprising one or more computer-executable instructions that, when executed by at least one processor of a computing device, cause the computing device to:
- identify a video game configured to be available to stream from a server within a cloud gaming environment;
- pre-load an instance of the video game on the server before receiving a request by a user to stream the video game to a client system by:
  - determining a subset of loading operations that do not depend on user-specific information to perform for the video game before receiving the request and a remainder of loading operations, at least a portion of which depend on user-specific information, to perform for the video game after receiving the request; and
  - pausing a loading procedure after performing the subset of loading operations;
- receive the request by the user to stream the video game; and
- allocate the pre-loaded instance of the video game to the user for streaming to the client system in response to receiving the request by the user to stream the video game;
- receive the user-specific information in connection with allocating the pre-loaded instance of the video game to the user; and
- resume the loading procedure in response to receiving the user-specific information and using the user-specific information while performing the remainder of loading operations.

* * * * *